United States Patent [19]

Jaffe

[11] Patent Number: 4,760,144
[45] Date of Patent: Jul. 26, 1988

[54] PROCESS FOR PREPARATION OF YELLOW SHADE MODIFICATION OF GAMMA QUINACRIDONE

[75] Inventor: Edward E. Jaffe, Wilmington, Del.

[73] Assignee: Ciba-Geigy Corporation, Ardsley, N.Y.

[21] Appl. No.: 929,867

[22] Filed: Nov. 13, 1986

[51] Int. Cl.$^4$ .............................................. C09B 48/00
[52] U.S. Cl. .................................. 546/49; 106/497
[58] Field of Search ............................................ 546/49

[56] References Cited

U.S. PATENT DOCUMENTS

| 3,074,950 | 1/1963 | Deuschel et al. | 546/49 |
| 3,547,925 | 12/1970 | Wagener | 546/49 |
| 3,726,873 | 4/1973 | Hashizume et al. | 546/49 |
| 3,892,751 | 7/1975 | Tyson et al. | 546/49 |
| 4,024,148 | 5/1977 | Tyson et al. | 546/49 |
| 4,298,398 | 11/1981 | Fitzgerald | 106/288 Q |
| 4,455,173 | 6/1984 | Jaffe | 546/56 X |
| 4,541,872 | 9/1985 | Jaffe | 546/49 X |

FOREIGN PATENT DOCUMENTS

| 1177268 | 9/1964 | Fed. Rep. of Germany | 546/49 |
| 0020073 | 9/1964 | Japan | 546/49 |
| 0039324 | 4/1978 | Japan | 546/49 |
| 1125577 | 8/1968 | United Kingdom | 546/49 |

OTHER PUBLICATIONS

Labana, et al., Chemical Reviews, vol. 67, No. 1, pp. 8-11, 15-17, Jan. 25, 1967.

Primary Examiner—Donald G. Daus
Assistant Examiner—Diana G. Rivers
Attorney, Agent, or Firm—Harry Falber

[57] ABSTRACT

Process for preparing yellow shade modification of gamma quinacridone whereby the $\gamma_{II}$ form is converted to the $\gamma_I$ form (1) by milling in an alcohol and in the presence of a base or (2) by premilling the $\gamma_{II}$ form to the $\gamma_I$ form and then refluxing or milling the resulting $\gamma_I$ form in an alcohol in the presence of a base, the resulting product being a highly crystalline, bright, yellow shade, ready dispersable $\gamma_I$ quinacridone pigment.

16 Claims, No Drawings

PROCESS FOR PREPARATION OF YELLOW SHADE MODIFICATION OF GAMMA QUINACRIDONE

Quinacridone, also referred to as 7,14-dioxo-5,7,12,14-tetrahydroquinolino(2,3-b)acridine of the following formula,

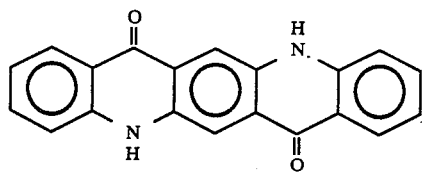

is known to exist in three polymorphic modifications. The alpha (U.S. Pat. No. 2,844,484) and gamma (U.S. Pat. No. 2,844,581 and U.S. Pat. No. 2,969,366) forms are bluish-red pigment while beta form (U.S. Pat. No. 2,844,485) is a violet pigment. All are known for their high insolubility and particularly high degree of weatherfastness. It was recognized some time ago that gamma quinacridone can exist in two forms (e.g. U.S. Pat. No. 3,074,950 and German No. 1,177,268), an older form (U.S. Pat. No. 2,844,581) which is bluish-red, and a more recently recognized form (U.S. Pat. No. 3,074,950) which is yellowish-red. These color differences are significant for relatively large particle size pigments exceeding an average particle size of 0.1 μm, preferably in the range of 0.2 to 0.7 μm, where the hiding powder and weatherfastness are maximized. The two forms are distinguished by their color and by their X-ray diffraction patterns. The bluish-red form, designated "$\gamma_{II}$", shows three strong lines at 6.6, 13.9 and 26.3; five medium lines at 13.2, 13.4, 23.6, 25.2 and 28.3; and two weak lines at 17.1 and 20.4 2θ (double glancing angle). The yellower and brighter form, designated "$\gamma_I$", shows three strong lines at 6.6, 13.9, and 26.5; three lines of medium intensity at 13.2, 13.5, and 23.8; and four weak lines at 17.1, 20.5, 25.2, and 28.6 2θ. The major, easily recognizable, distinction lies in the pronounced triplet between 13 and 14 2θ (double glancing angle). Gamma II shows two peaks separated by 0.2 2θ at 13.2 and 13.4 2θ, of essentially equal intensity, both being less intense than the band at 13.9. Gamma I, on the other hand, shows a somewhat greater separation between the lowest 2θ peaks at 13.2 and 13.5, all three peaks increasing in intensity with increasing double glancing angle (2θ). The gamma I form is further distinguished by increased hiding power, good general fastness, excellent fastness to light and weathering, resistance to high temperatures and resistance to attack by solvents or softeners.

The processes disclosed in U.S. Pat. No. 3,074,950 for preparing the new form of gamma quinacridone generally involve multiple steps such as dissolution in sulfuric acid, dilution with water or alcohol, salt milling and contacting with N-methylpyrrolidone; or salt milling in the presence of the pyrrolidone and a water-soluble inorganic salt or an alkali; or mixing a quinacridone filtration cake with the pyrrolidone and then distilling and heating. The disadvantages of such approaches include the need for a multiplicity of steps, the use of concentrated sulfuric acid, the use of the high boiling pyrrolidone and the unfavorable economics inherent in these disadvantages.

Correspondingly, the process disclosed in German No. 1,177,268 starts with the intermediate required for the preparation of quinacridone. Thus, 2,5-dianilinoterephthalic acid is reacted with benzoyl chloride as the cyclizing agent and nitrobenzene as the solvent in the presence of N-methylpyrrolidone for phase control. Once again, difficult to handle chemicals are used, while adequate control of particle size is doubtful.

Accordingly, it is the primary object of this invention to provide improved methods for the preparation of gamma I quinacridone having excellent pigmentary properties.

It is a further object to provide such processes which substantially overcome the disadvantages of prior art procedures.

Various other objects and benefits of this invention will become apparent from the following descriptive material.

It has now been surprisingly discovered that $\gamma_{II}$ quinacridone can be readily and efficiently converted into $\gamma_I$ quinacridone having an average particle size in exces of 0.1 μm and a surface area less than 30 square meters per gram without sacrifice of performance characteristics by either a one-step or a two-step procedure based on milling of the $\gamma_{II}$. Thus, the present invention involves a one-step conversion of $\gamma_{II}$ to $\gamma_I$ by milling in an alcohol and in the presence of a base or a two-step process which accomplishes the conversion to $\gamma_I$ more rapidly and which involves premilling $\gamma_{II}$ where conversion to $\gamma_I$ occurs, followed by refluxing or milling the resulting material in an alcohol in the presence of a base to convert the initially prepared relatively low crystallinity $\gamma_I$ to a highly crystalline, bright, yellow shade, strongly hiding, readily dispersible $\gamma_I$ pigment. Both variations produce products of desirable properties.

The milling is an essential function in the one-step process, since simple reflux of $\gamma_{II}$ in the same medium fails to cause phase type conversion. On the other hand, once conversion has occurred on premilling in the two-step process, simple reflux in alcoholic base causes particle growth and retention of the desired form $\gamma_I$. However, in order to achieve maximum tinctorial characteristics, even in the two-step process, milling in alcoholic base is the preferred procedure.

It is thus seen that the invention is characterized by simplicity and economy of operation and by the use of easily accessible low boiling solvents. Unlike the process in U.S. Pat. No. 3,074,950, it avoids the use of concentrated sulfuric acid for dissolving the crude pigment followed by precipitation of the pigment and its subsequent isolation and acid removal. In addition, it avoids the use of the high boiling solvent N-methylpyrrolidone, in which phase conversion is accomplished, and the need to partially distill the solvent and isolate the pigment from this solvent. Unlike the process in German No. 1,177,268, difficult to handle chemicals are avoided and excellent control over particle size is achieved.

The novel process for preparation of the $\gamma_I$ form of quinacridone of high color intensity, yellow shade and effective hiding properties is accomplished in either one or two steps. The one-step process causes $\gamma_{II}$ quinacridone conversion to $\gamma_I$ and particle growth in the same medium, milling being an essential element in helping to expose fresh pigment surfaces to the action of the alcoholic base. The quinacridone is capable of forming a salt which is subject to alcoholysis back to quinacridone in a reaction which eventually causes complete conversion to $\gamma_I$ and simultaneous or consecutive particle growth.

The one-step approach generally proceeds by charging the crude $\gamma_{II}$ quinacridone, alcohol and base to an appropriate mill, introducing the milling elements, milling the system at a temperature of 20° to 50° C., preferably room temperature, for a period of about 24 to 96 hours and isolating the resulting $\gamma_I$ quinacridone. Applicable solvents are low boiling alcohols such as methanol, ethanol, butanol and pentanol; and glycols such as ethylene glycol. Methanol is preferred. Applicable bases include alkali metal hydroxides such as potassium hydroxide, sodium hydroxide, and lithium hydroxide. Potassium hydroxide is preferred in that it is most effective in optimizing particle growth and pigment brightness. The alcohol is generally present in an amount ranging from 6.6 to 18 times the weight of pigment, and preferably 10 to 16 times, and most preferably 16 times. Correspondingly, the base is generally present as an aqueous solution (on a base content) in an amount ranging from 1.0 to 10.0%, by weight of alcohol, and preferably 2.2–4.5%, and most preferably 3.3%. The pigment loading will generally range from 50–100 parts per milling for maximum effectiveness.

In the two-step process, the first step involves premilling of the crude $\gamma_{II}$ for conversion to $\gamma_I$ with particle size reduction. Particle growth is accomplished in the second step at a comparatively higher pigment loading and shorter milling time, relative to the one-step process. Thus, the absence of premilling in the one-step process necessitates a lower loading and a somewhat longer milling cycle to achieve the same tinctorial properties relative to the two-step process.

Premilling, as used in this invention, refers to milling in the complete absence of liquids, or if liquids are used, such as a phase directing solvent or a surface active agent, they are present in such small amounts (maximum of about 10.0% by weight of pigment) or of such a nature that the pigment retains the characteristics of a powder.

Premilling operations are known and can be accomplished in various ways. Thus, it is possible to premill with 12.7 mm steel balls and roofing nails or, to avoid metal attrition and the corresponding need for pigment extraction with dilute acid, premilling can be accomplished with 12.7 mm high density, high alumina ceramic balls or rods (Diamonite Products Manufacturing, Inc.). Alternatively, the premilling can be conducted with the same balls or beads used in the second step of the process. Grinding beads of 1.6 to 2.5 mm size made from crystalline zirconia phase and amorphous silica phase by fusion of the oxides are particularly suitable (product of Quartz Products Corporation). Although a variety of sizes can be used, the aforementioned size is quite suitable for the two steps comprising this process. The same milling media are also suitable for the one-step process.

Although $\gamma_I$ can be obtained by premilling with 12.7 mm steel balls or 3.2 mm steel shot, the brightness and yellowness of the resulting products is somewhat reduced as a result of metal attrition and the need to extract the pigment with dilute acid. Metal filings or powder generated during milling with metallic media must be removed from the pigment. This is conventionally done by acidification of the ultimately resulting aqueous suspension of pigment to pH 1 to 2 with mineral acid, and digestion at 80°–90° C. to affect complete metal removal. Contact of gamma quinacridone with dilute hot acid causes a noticeable blue hue shift. Thus, to avoid acid extraction in the two-step process, both the premilling and the alcohol milling are preferably conducted with nonmetallic media.

During the dry milling operation when energy is put into the system, $\gamma_{II}$ is converted to $\gamma_I$ as is evidenced by a change in the X-ray diffraction pattern. The conversion occurs rapidly, generally within 12 hours of relatively mild milling. The resulting product is significantly smaller in particle size and shows a lower degree of crystallinity relative to the starting material. Further confirmation comes from a comparison of its transparency and X-ray diffraction pattern with that of the starting material. In masstone, as a self color, the premilled pigment is indeed much darker, duller, and more transparent than the starting material $\gamma_{II}$. The conversion experienced in the premilling operation suggests that the $\gamma_I$ form is thermodynamically less stable than the $\gamma_{II}$ form. Accordingly, if milling is continued in excess of about 70 hours, of if the pigment loading is decreased below about $\frac{1}{4}$ of normal loading, the pigment is converted to the alpha phase, the least thermodynamically stable of all quinacridone polymorphs. Once formed, the $\gamma_I$ phase is stable, and in fact is the preferred phase in the alcoholic base medium of the liquid milling step, as well as upon incorporation of the pigment into dispersions intended for the production of automotive or industrial coatings.

In the second step of the two-step process, the relatively low crystallinity $\gamma_I$ type generated in the first step is particle grown by milling in alcohol containing base to lead to a highly crystalline, relatively strongly hiding, bright yellowish-red pigment. A similar conversion can be obtained by refluxing the millpowder in basified alcohol but the product exhibits a somewhat lower level of brightness than that obtained by milling the pigment in the same medium. Once again, a variety of alcohols can be used such as methanol, ethanol, butanol, pentanol, glycol, and the like, the most preferred in terms of performance being methanol. Likewise, a variety of bases as noted above can be used but potassium hydroxide is the most effective in optimizing the pigment brightness by providing efficient and rapid particle growth.

The concentrations of base and alcohol are as noted in the one-step process and are selected to optimize the masstone pigment brightness. At the indicated base concentration, there is no visible formation of a quinacridone potassium salt, which when formed can be easily recognized due to its distinct blue color vs. the red color of the pigment. However, during the milling operation, the mechanism of particle growth is believed to involve formation of a very small concentration of the salt, which is more soluble in alcohol and thus subject to particle growth followed by alcoholysis to the pigment. This dynamic particle ripening system eventually permits all of the pigment to reach a certain equilibrium particle size. Temperatures for the liquid milling operation range from 20° to 50° C., and preferably 20°–30° C. The higher the temperature during milling, the larger the particle size of the resulting pigment.

The grinding of the dry pigment can be conducted in the optional presence of various additives, including inorganic salts such as anhydrous sodium sulfate. The presence of the latter is intended to avoid possible explosivity of the generated millpowder. Addition of sodium sulfate is not essential since the millpowder is fairly aggregated and not dusty when using steel or ceramic (½") balls. Likewise, when using zirconia/silica beads most of the premilled pigment adheres to the surface of the beads largely avoiding the formation of a pourable powder. In the subsequent liquid milling step, the powder comes off the surface upon contact with solvent. Similarly, the premilled pigment can be simply collected as a powder when using ⅛" balls or rods.

If desired, various surfactants, extenders, or particle growth inhibitors can be introduced at the alcohol/base milling step, (either one- or two-step approach) provided the additives are not subject to inactivation by the basic medium. Simple addition of anionic, cationic, or nonionic surfactants to the liquid milling operation, assuming the materials are not water soluble, will cause them to come out in a uniform manner on the surface of the pigment and consequently alter the pigment behavior. Thus, introduction of as little as 2%, by weight, dehydroabietylamine based on weight of pigment produces a product which by drawdown in lithographic varnish shows somewhat increased opacity relative to a product prepared without the surfactant. Even with the possibility of such modifications, the primary objective of the present invention is the generation of large particle size, opaque yellow-shade red $\gamma_I$ pigment.

Although the ultimate particle size (greater than 0.1 micron, and preferably 0.2 to 0.7 microns) is generated in the liquid milling operation, and thus the product could be isolated directly from the milled slurry after grinding media separation, the pigment is best isolated by separating the pigment slurry from the milling media by means of alcohol and/or water dilution and milling media washing with either solvent, followed by alcohol distillation from the mixed alcohol-water slurry. The alcohol can thus be recovered, and pigment isolated from a nonflammable slurry by filtration. After isolation, the pigment is washed with water free of base. The resulting product is a very yellowish-red, with a pronounced improvement in color brightness vs. a commercial $\gamma_{II}$ product of similar particle size. The pigment shows excellent outdoor durability and very good hiding power or opacity. In view of the above properties, it is a very valuable pigment in styling industrial and particularly automotive finishes, either as a sole pigment or often in combination with other compatible pigments. The pigment is the yellowest shade red of all known forms of unsubstituted quinacridone.

Pigmented systems which contain the pigment as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amine and peroxide curing varnishes or polyurethane varnishes. The pigment may also be present in synthetic, semisynthetic or natural macromolecular substances, such as thermoplastic resins, e.g., polyvinyl chloride, polystyrene, polyethylene, polyesters, phenoplasts, aminoplasts and rubber. The pigment may also be present in admixture with natural, regenerated or synthetic fibers, such as glass, silicate, asbestos, wood cellulose, acetylcellulose, polyacrylonitrile, polyester, polyurethane and polyvinyl chloride fibers or mixtures of the same, and also in powders, for example organic or inorganic pigments. With the new pigment there are obtained prints, paint and varnish coatings, coverings, shaped articles, such as sheets, threads, plates, blocks, granulates and rods with a brilliant red color of excellent durability.

The mixtures of substances which contain as active coloring ingredient the brilliant yellowish-red pigment of good hiding power, may be of solid, elastic, pasty, viscous, mobile or thixotropic consistency. They may be obtained by conventional methods. Aqueous pastes may be obtained for example by stirring the pigment into water, possibly with the addition of a wetting or dispersing agent or by stirring or kneading the pigment into a dispersing agent in the presence of water and possibly of organic solvents or oils. These pastes may for example be used for the production of flush pastes, printing colors, distempers, plastic dispersions and spinning solutions. The pigment may also be introduced by stirring, rolling, kneading or grinding into water, organic solvents, non-drying oils, drying oils, lacquers, varnishes, plastics or rubber. Finally, it is also possible to work up the pigment by dry mixing with organic or inorganic masses, granulates, fibrous materials, powders and other pigments, to form mixtures of substances.

In addition to its excellent hiding power, outstanding purity of shade and good general fastness, such as fastness to light and weathering and solvent and softener resistance, the pigment is also characterized by superior resistance to high temperatures. For example, in contrast to the modifications hitherto known, the thermal behavior of the pigment makes it possible to work it into high and low density polyethylene or polypropylene, without the shade of color being dulled by the effect of the temperature during working up. The superiority of the pigment in hiding power and purity of shade is also shown for example in automobile finishes; to achieve the same hiding power, a smaller amount of the new product is required than of the known gamma-modification of quinacridone. Finishes of greater brightness can also be obtained.

The following examples further illustrate the embodiments of this invention. In these examples, all parts given are by weight unless otherwise indicated.

EXAMPLE I

This example describes the conversion of $\gamma_{II}$ quinacridone to $\gamma_I$ by premilling with ceramic beads, and continued milling of $\gamma_I$ in methanol containing potassium hydroxide.

A 2.84 liter mill is charged with 2,500 parts ceramic beads ranging in size from 1.6 to 2.5 mm and consisting on average of about 69% $ZrO_2$ and 31% $SiO_2$, 50 parts crude $\gamma_{II}$ quinacridone, and 5 parts anhydrous sodium sulfate. The mill is rotated at room temperature for 10 hours at 68 RPM, which is about 74% of the critical speed ("critical speed" is the speed at which the centrifugal force overcome the force of gravity so that the grinding elements are retained against the outer wall of the mill).

A small amount (36 parts) of balls to which pigment adheres is removed from the mill and the pigment washed off with methanol. The slurry is filtered and the dry product examined by X-ray. The product is less crystalline than the starting material and is identified, at least in large part, as $\gamma_I$ quinacridone.

The mill is then charged with 791 parts methanol followed by 75 parts 43.5% aqueous KOH and the mill rotated for 48 hours at the same revolutions per minute. The mill is discharged onto a screen which retains the ceramic beads. The beads are washed with about 1,000 parts water, so that essentially all of the pigment is collected as a slurry. The basic slurry is transferred to a 4-neck flask equipped with a stirrer, thermometer, Dean Stark tube and condenser. Heat is applied and methanol together with some water is distilled off. The temperature slowly rises as the methanol is distilled off. When the temperature reaches 90°–93° C., distillation is discontinued. The product is isolated by filtration of the hot slurry and the pigment washed free of base with water. After drying at 80° C., the weight of pigment is 47.6 parts.

Pigmentary properties are determined utilizing rubouts in lithographic varnish prepared using a Hoover Muller from Hoover Color Corporation, Irvington, N.J. The apparatus is equipped with a ½ HP 110–22 V, 60 cycle motor and two glass plates. The Muller can be adjusted to stop after 25, 50, 75, or 100 revolutions with 50 revolutions being considered normal. Three weights are used which apply 150 pounds pressure between the plates, which is considered a normal operation. In each case, 0.6 parts of dry pigment and 1.2 parts of a lithographic varnish drier are mixed with a spatula on the lower glass plate. The upper plate is locked to the lower plate and the motor is set to stop after fifty revolutions. The plates are separated and the pigment in ink dispersion is picked up and spread out again on the lower plate and the operation repeated six more times. The resulting pigment as an ink dispersion, referred to as the masstone ink, is drawn down versus an appropriate control prepared in the identical manner. In order to assess color strengths of the samples, calculated amounts of the masstone ink and a zinc oxide paste dispersion are weighed accurately and mixed with a spatula on a polished glass plate. The resulting extensions, referred to as tints, are drawn down versus an appropriate control prepared in an identical manner. Visual comparison of both the masstones and tints are made either when wet or after drying at room temperature for several days.

When the pigment of this example is rubbed out in a lithographic varnish and its masstone and tint ($TiO_2$ extension) are compared side by side with a $\gamma_{II}$ commercial product, it is seen to be significantly yellower and more intense (brighter) in masstone and considerably yellower and more intense in tint.

EXAMPLE II

This example describes the one-step process for preparation of a large particle size $\gamma_I$ quinacridone.

A 2.84 liter mill is charged with 2,500 parts ceramic beads ranging in size from 1.6 mm to 2.5 mm and consisting on average of about 69% $ZrO_2$ and 31% $SiO_2$, 50 parts crude $\gamma_{II}$ quinacridone, 791 parts methanol, and 75 parts 43.5% aqueous KOH. The mill is rotated for 72 hours at room temperature and 68 RPM which is about 74% of critical speed. The mill is discharged onto a screen which retains the ceramic beads. The beads are washed with about 1,000 parts water, so that essentially all of the pigment is collected as a slurry. The basic slurry is transferred to a 4-neck flask, equipped with a stirrer, thermometer, Dean Stark tube and condenser. Heat is applied and methanol together with some water is distilled off. The temperature slowly rises as the methanol is distilled off. When the temperature reaches 90°–93° C., distillation is discontinued. The product is isolated by filtration of the hot slurry and the pigment washed free of base with water. After drying at 80° C., the weight of pigment is 48.2 parts, and its X-ray pattern shows it to be $\gamma_I$.

When rubbed out in a lithographic varnish, the product is essentially identical in masstone and tint to the product of Example I.

EXAMPLE III

This example describes the conversion of $\gamma_{II}$ quinacridone to $\gamma_I$ by premilling with ceramic rods, followed by ripening of $\gamma_I$ by milling in methanolic/KOH or refluxing methanol containing KOH.

A laboratory scale ball mill is charged with 871 parts of 12.7 mm diameter ceramic rods, 50 parts crude $\gamma_{II}$ quinacridone, and 5.0 parts anhydrous sodium sulfate. The mill is rotated at about 75% of the critical speed for 24 hours. The mill is opened and its contents discharged through a screen which retains the rods.

A portion of the millpowder (56 parts) is then introduced into a 2.84 liter laboratory scale mill containing 2,500 parts ceramic beads ranging in size from 1.6 to 2.5 mm, 971 parts methanol and 75 parts 43.5% aqueous KOH. Milling and workup is conducted exactly as described in Example I. The product is essentially identical by X-ray diffraction pattern and rubout in lithographic varnish to the product of Example I.

Alternately, 11 parts of the same millpowder are dispersed in 158.2 parts methanol containing 15 parts 43.5% aqueous KOH, stirred vigorously, and refluxed for 48 hours. The pigment is isolated after addition of water and distillation of the methanol. The product is a $\gamma_I$ phase but is somewhat tinctorially different from the milled counterpart. Thus, the pigment isolated from boiling methanolic base is somewhat darker and duller in masstone and weaker in tint vs. the milled counterpart. Although a $\gamma_I$ pigment is prepared, the product obtained by the milling process is preferred since the tinctorial properties of the masstone are paramount.

EXAMPLE IV

This example shows the need for the prescribed presence of base in the alcohol milling step.

Six parts of crude $\gamma_{II}$ quinacridone and 0.6 parts of anhydrous sodium sulfate are charged into a laboratory scale ball mill containing 300 parts grinding beads of 1.6–2.5 mm size and the mill rotated for 7.5 hours at approximately 75% of critical speed. Two identical millings are performed.

The mills are opened, one (1) being charged with 79 parts methanol and the other (2) with 79 parts methanol and 10 parts of 43.5% aqueous KOH solution. Both mills are then rotated for 72 hours. The resulting slurries are worked up as described in Example 1. Both presscakes are washed to the point where the filtrates show 95% resistivity relative to the water used for washing. After drying, 5.2 parts pigment are obtained from milling (1) and 5.3 parts from milling (2). Both pigment samples are shown to be $\gamma_I$. However, sample (2) is larger in particle size and more crystalline. This is further reflected in a comparison of the two samples in a lithographic varnish rubout comparison. Sample (2) is significantly yellower and much more intense in masstone and yellower and weaker in tint vs. sample (1). For styling of solid automotive colors, the intensity of the masstone is of paramount importance.

EXAMPLE V

This example describes liquid milling in methanol and sodium hydroxide.

Example IV (2) is identically repeated with the exception that 10 parts of 50% aqueous NaOH is used in place of the KOH. The resulting product is $\gamma_I$ in nature although its brightness is somewhat reduced relative to a product prepared in the presence of KOH.

EXAMPLE VI

This example illustrates the effect of temperature on the liquid milling procedure.

Example I is repeated with the exception that the liquid milling is performed at 49°–54° C. The resulting product is yellower in masstone, better in hiding and somewhat weaker in tint than the product of Example I. By X-ray, it was $\gamma_I$ of a particularly high degree of crystallinity.

EXAMPLE VII

This example illustrates the use of ceramic 12.7 mm balls in the premilling operation.

A laboratory scale ball mill is charged with 870 parts of 12.7 mm high alumina ceramic balls, 50 parts crude gamma quinacridone, and 5 parts anhydrous sodium sulfate. The mill is rotated at about 75% of critical speed for 24 hours. The mill is opened and the contents discharged through a screen which retains the balls. The balls are stirred to increase the yield of the desired pre-millpowder.

A portion of the resulting millpowder (82 parts) is charged into a 2.84 liter laboratory scale ball mill containing 2,500 parts of grinding beads 1.6–2.5 mm size, 791 parts methanol, and 75 parts 43.5% aqueous KOH. The mill is rotated at about 74% of critical speed for 72 hours. The mill is discharged onto a screen which retains the grinding beads. The beads are washed with about 1,000 parts water so that all pigment is collected as a slurry. The resulting slurry is heated, alcohol distilled off, and pigment isolated as described in Example I. The product is $\gamma_I$ showing an X-ray diffraction pattern and tinctorial and hiding properties similar to those observed with the product of Example I.

In addition, when using 48 hour premilled powder, the loading can be increased to 110 parts with similar results.

EXAMPLE VIII

This example illustrates the adverse effect of dilute acid extraction on the brightness or intensity of the resulting product.

A slurry of methanol/KOH milled product essentially as described in Example I is split by weight in two identical parts. One part is subjected to distillation until the temperature of the slurry reaches 93° C. and then the product is isolated. The second part is cooled after reaching 93° C. to 85° C. and acidified to pH=1.4 with 82% sulfuric acid. The temperature is maintained at 85°±2° C. for one hour and then the product isolated by filtration, and washed with water till free of acid. Both products are dried at 80° C. By rubout in lithographic varnish, the acid treated product was noticeably bluer and duller in masstone vs. the acid untreated counterpart. In tint, the products were essentially equal in strength and color. These results attest to the benefits of the instant process as contrasted to prior art approaches requiring such acid treatment.

EXAMPLE IX

This example illustrates the use of n-butanol rather than methanol in the liquid milling step.

A 2.84 liter mill is charged with 2,500 parts ceramic beads, $\gamma_{II}$ quinacridone and sodium sulfate and milled as described in Example I. The mill contents are discharged. The beads are coated with the premilled pigment. Three hundred grams of the material are introduced into a laboratory scale ball mill followed by 81 parts n-butanol and 7.5 parts 43.5% aqueous KOH. The mill is rotated for 72 hours at about 75% of critical speed. The pigment slurry is separated from the beads and the latter are washed with 150 parts water. The combined slurries are heated and n-butanol distilled until the temperature of the slurry reaches 100° C. The pigment is isolated by filtration and the presscake washed free of base with water. The 4.9 parts of resulting dry pigment are found to be $\gamma_I$ type of smaller particle size than that of Example I. By rubout in lithographic varnish, the product appears duller and more transparent in masstone and slightly stronger in tint (TiO$_2$ extension) than the product described in Example I.

EXAMPLE X

This example shows the beneficial effect of $\gamma_I$ surface treatment on rheology of an alkyd paint dispersion and on the appearance of an automotive finish.

The product of Example I (91.0%, by weight) is copulverized with 3%, by weight, 2-phthalimidomethylquinacridone and 6%, by weight, of a polymeric dispersant. When evaluated in an alkyd automotive system, a significant improvement in viscosity of the dispersion and gloss of the ultimate finish is realized vs. an untreated counterpart. Relevant data are shown below.

|  | Viscosity in CPS* | Gloss of Masstone** |
| --- | --- | --- |
| Untreated $\gamma_I$ pigment | 2,460 | 78 |
| Product of this example | 1,750 | 90 |

*Brookfield Digital Viscometer (Model RVTD) at 10 rpm, spindle #3, at 23° C.
**Masstone paint panel (10 cm × 15 cm. 10 gauge aluminum, gray acrylic primed panel spray painted to visual hiding over a black and white checkerboard) is prepared and dried and 20° gloss is measured with a gloss meter Glossguard System 20/60/85 (Model G67526).

Summarizing, it is seen that this invention provides improved approaches to the conversion of $\gamma_{II}$ quinacridone to $\gamma_I$ quinacridone in the preferred 0.2 to 0.7 μm particle size range. Variations may be made in proportions, procedures and materials without departing from the scope of the invention as defined by the following claims.

What is claimed is:

1. A process for converting crude gamma-phase II quinacridone to gamma-phase I quinacridone having an average particle size in excess of 0.1 μm and a surface area less than 30 square meters per gram which comprises milling the crude quinacridone in the presence of a converting system consisting essentially of effective converting amounts of a lower alcohol or glycol and a base and isolating the yellow-shade gamma-phase I quinacridone.

2. The process of claim 1, wherein said alcohol or glycol is selected from the group consisting or methanol, ethanol, butanol, pentanol and ethylene glycol.

3. The process of claim 2, wherein said alcohol is methanol.

4. The process of claim 1, wherein said base is an alkali metal hydroxide.

5. The process of claim 4, wherein said base is potassium hydroxide.

6. The process of claim 1, wherein said alcohol is methanol and said base is potassium hydroxide.

7. The process of claim 1, wherein said alcohol is present in an amount ranging from 6.6 to 18 times the weight of said quinacridone, and said base is present in an amount ranging from 1.0 to 10.0% by weight of said alcohol.

8. A process for converting crude gamma-phase II quinacridone to gamma-phase I quinacridone having an average particle size in excess of 0.1 μm and a surface area less than 30 square meters per gram which comprises the steps of dry premilling the crude quinacridone for conversion to the gamma I form, contacting said premilled quinacridone with a system consisting essentially of a lower alcohol or glycol and a base, refluxing the resulting quinacridone dispersion and isolating the yellow shade gamma-phase I quinacridone.

9. The process of claim 8, wherein said alcohol is methanol and said base in potassium hydroxide.

10. A process for converting crude gamma-phase II quinacridone to gamma-phase I quinacridone having an average particle size in excess of 0.1 μm and a surface area less than 30 square meters per gram which comprises the steps of dry premilling the crude quinacridone for conversion to the gamma I form, milling the premilled quinacridone in the presence of a system consisting essentially of effective particle growth promoting amounts of a lower alcohol or glycol and a base and isolating the yellow shade gamma-phase I quinacridone.

11. The process of claim 10, wherein said alcohol or glycol is selected from the group consisting of methanol, ethanol, butanol, pentanol and ethylene glycol.

12. The process of claim 11, wherein said alcohol is methanol.

13. The process of claim 10, wherein said base is an alkali metal hydroxide.

14. The process of claim 13, wherein said base is potassium hydroxide.

15. The process of claim 10, wherein said alcohol is methanol and said base is potassium hydroxide.

16. The process of claim 10, wherein said alcohol is present in an amount ranging from 6.6 to 18 times the weight of said crude quinacridone, and said base is present in an amount ranging from 1.0 to 10.0%, by weight of said alcohol.

* * * * *